United States Patent [19]

Lecomte et al.

[11] Patent Number: 4,725,119
[45] Date of Patent: Feb. 16, 1988

[54] DEVICE FOR SEMI-PERMANENT CONNECTION OF OPTICAL FIBRES AND METHOD FOR ESTABLISHING THE SAME

[75] Inventors: Joel Lecomte, Asnieres; Marie C. Soster, Rueil Malmaison, both of France

[73] Assignee: Amphenol Corporation, Wallingford, Conn.

[21] Appl. No.: 681,200

[22] Filed: Dec. 13, 1984

[30] Foreign Application Priority Data

Dec. 16, 1983 [FR] France ............... 83 20197

[51] Int. Cl.⁴ .................................. G02B 6/38
[52] U.S. Cl. .................................. 350/96.21
[58] Field of Search ............... 350/96.21, 96.22

[56] References Cited

U.S. PATENT DOCUMENTS

| | | | |
|---|---|---|---|
| 4,208,095 | 6/1980 | Malsot | 350/96.21 |
| 4,213,671 | 7/1980 | Lambert | 350/96.21 |
| 4,220,397 | 9/1980 | Benasutti | 350/96.21 |
| 4,276,113 | 6/1981 | Carlsen et al. | 350/96.21 |
| 4,322,127 | 3/1982 | Comerford et al. | 350/96.21 |
| 4,353,619 | 10/1982 | Parr | 350/96.21 |
| 4,458,984 | 7/1984 | Roberts et al. | 350/96.21 |
| 4,473,272 | 9/1984 | Johnson | 350/96.21 |
| 4,522,463 | 6/1984 | Schwenda et al. | 350/96.21 |
| 4,562,632 | 1/1986 | Parchet et al. | 350/96.21 |

Primary Examiner—William L. Sikes
Assistant Examiner—Robert E. Wise
Attorney, Agent, or Firm—Bacon & Thomas

[57] ABSTRACT

A device for establishing a semi-permanent connection of optical fibres comprises an elastic clamp associated with two retaining clamps which are mounted by attachment means such as clips on a support. The clips when in rest position on the support, are adapted to be brought selectively into a first position wherein the corresponding clamp is held with sufficient force for the fibres to be able to slide above them, and a second position wherein the fibres are blocked in place under the corresponding clamp. To establish the connection a fibre is blocked in position under a retaining clamp and an opposite second fibre slides under the opposite retaining clamp and the elastic clamp until its end abuts with that of the first fibre. Thereafter, the clips of the two clamps are placed in the second position so as to secure the connection.

4 Claims, 22 Drawing Figures

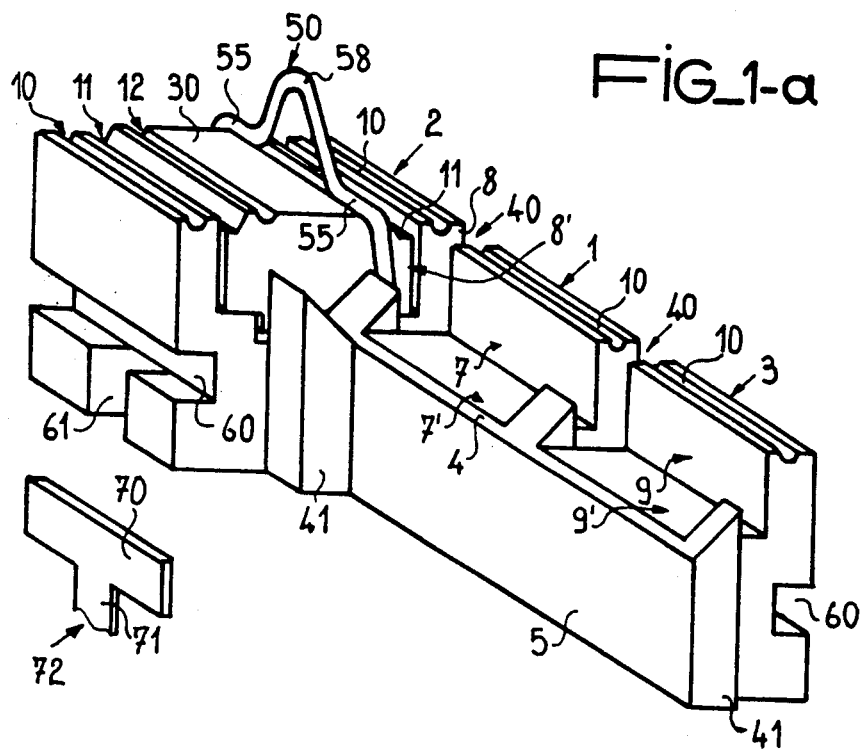
FIG_1-a
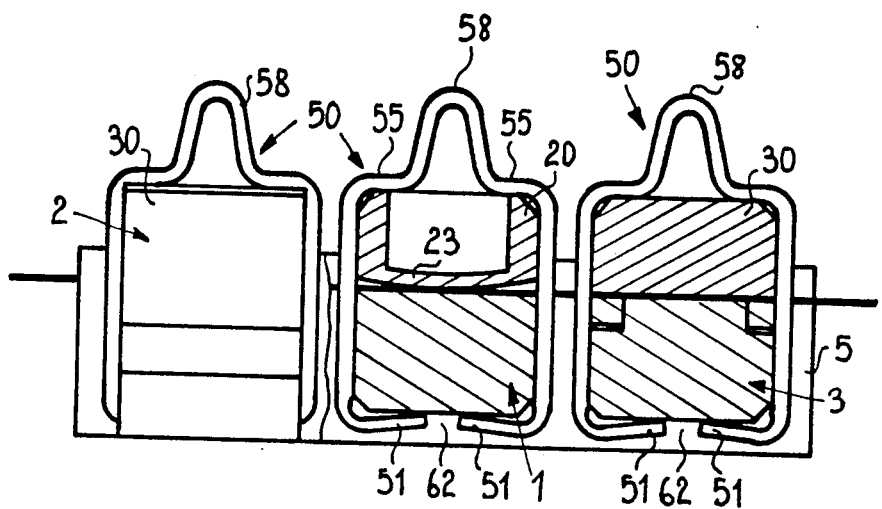
FIG_1-b

FIG_2
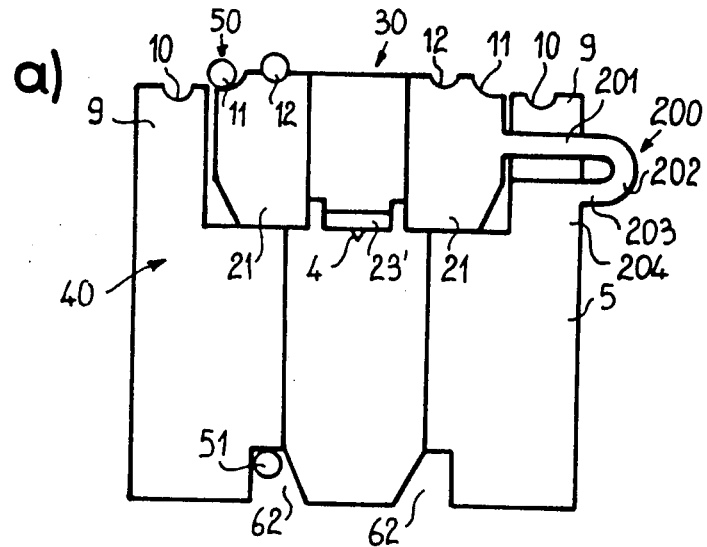
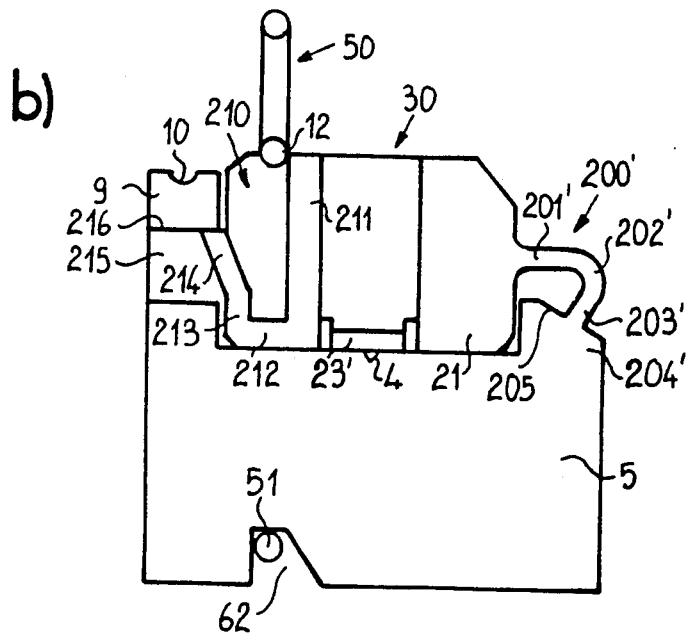

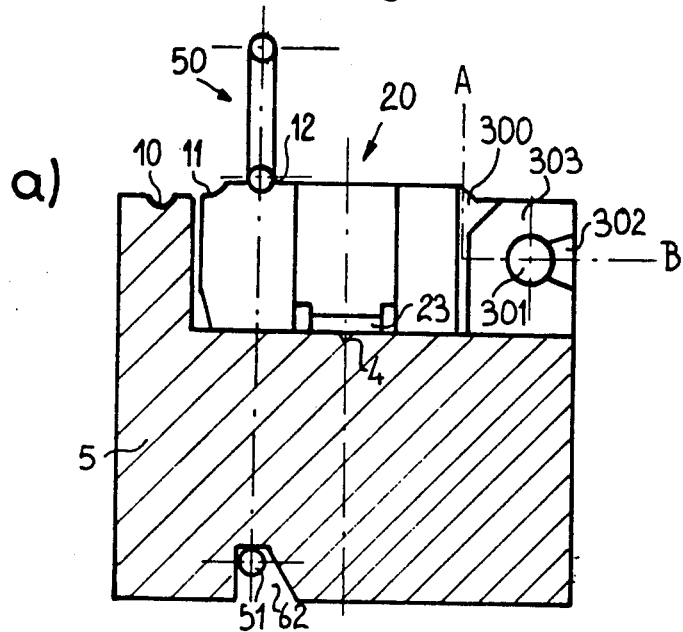
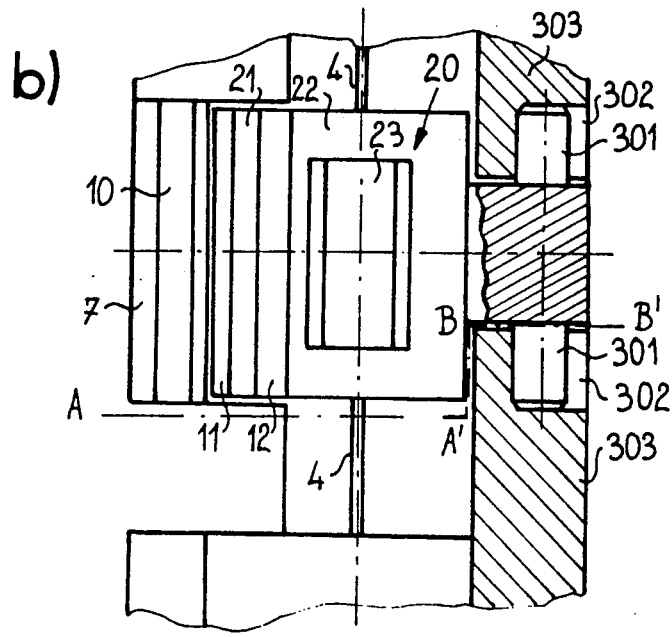
FIG_3

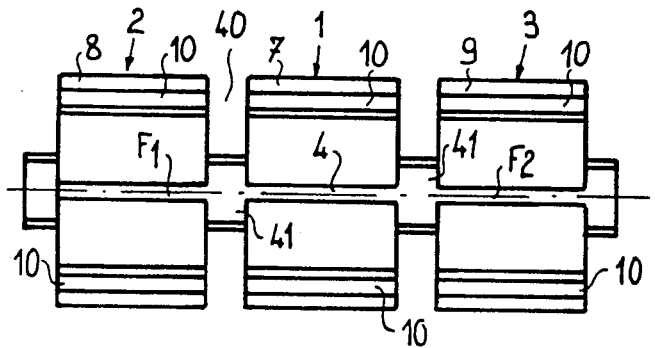
FIG_4-a
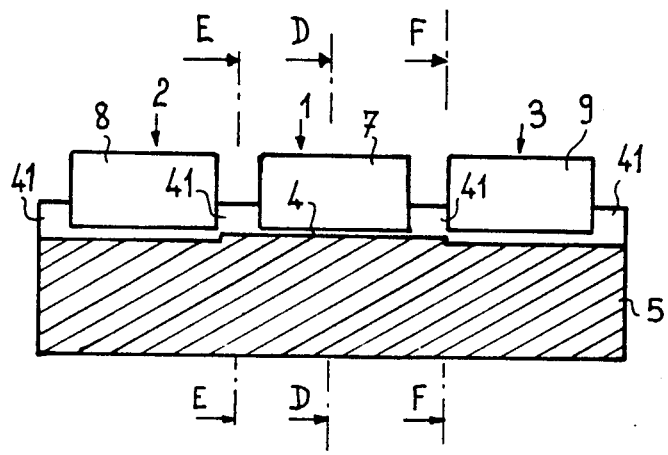
FIG_4-b
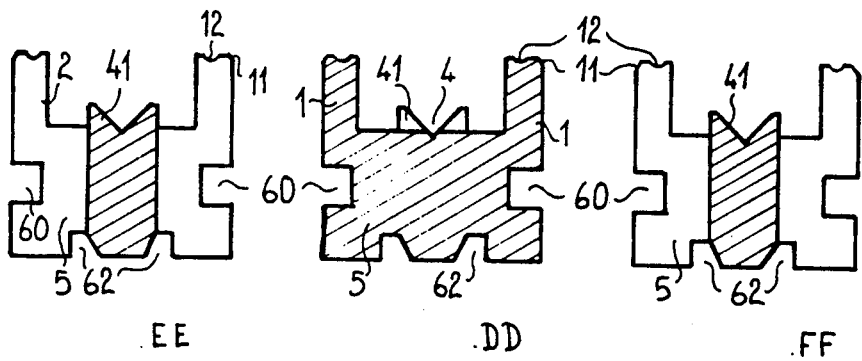
FIG_4-c  FIG_4-d  FIG_4-e

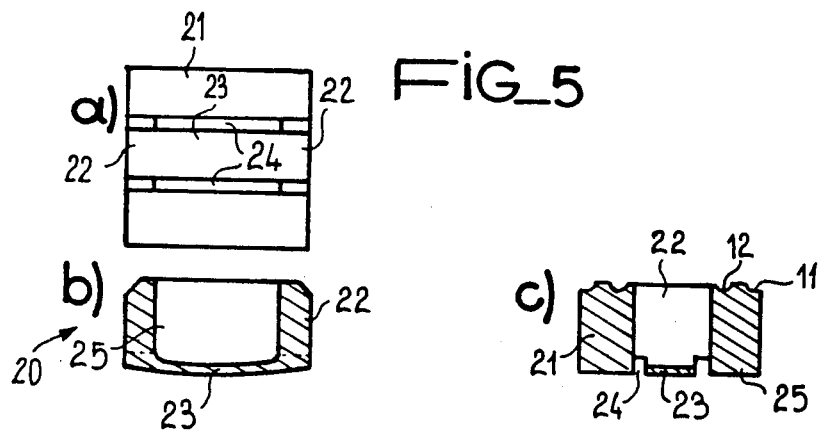
FIG_5
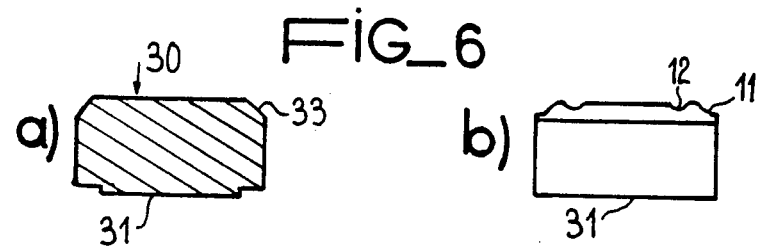
FIG_6
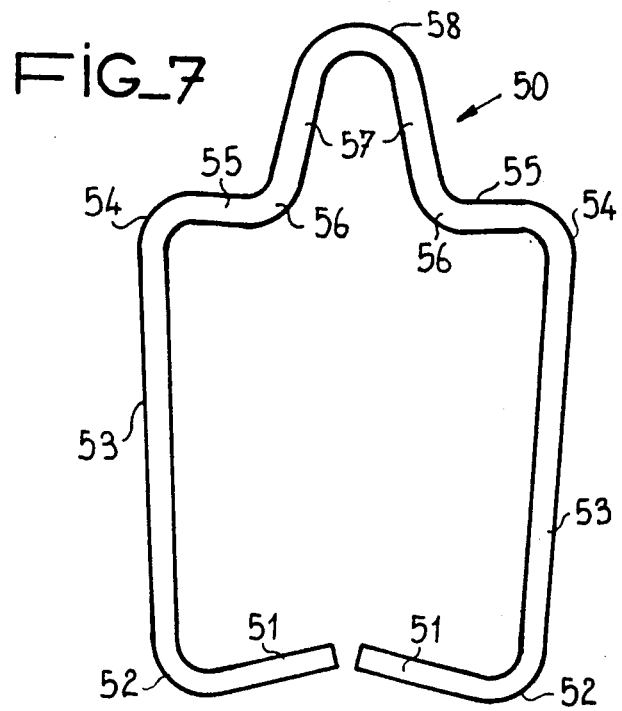
FIG_7

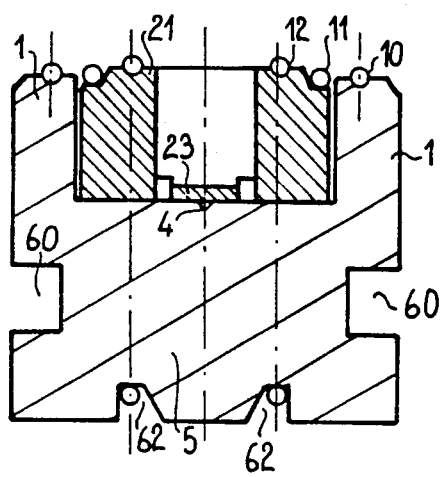
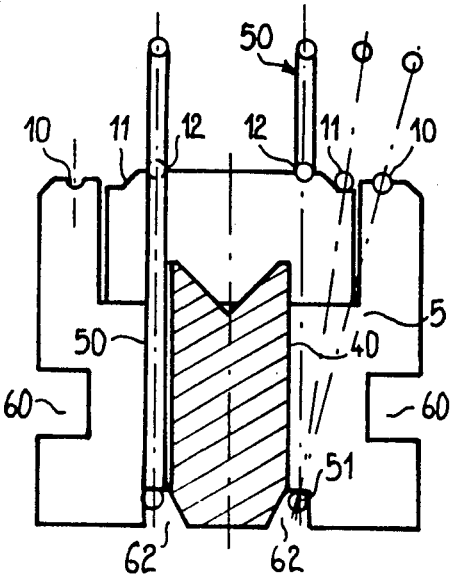
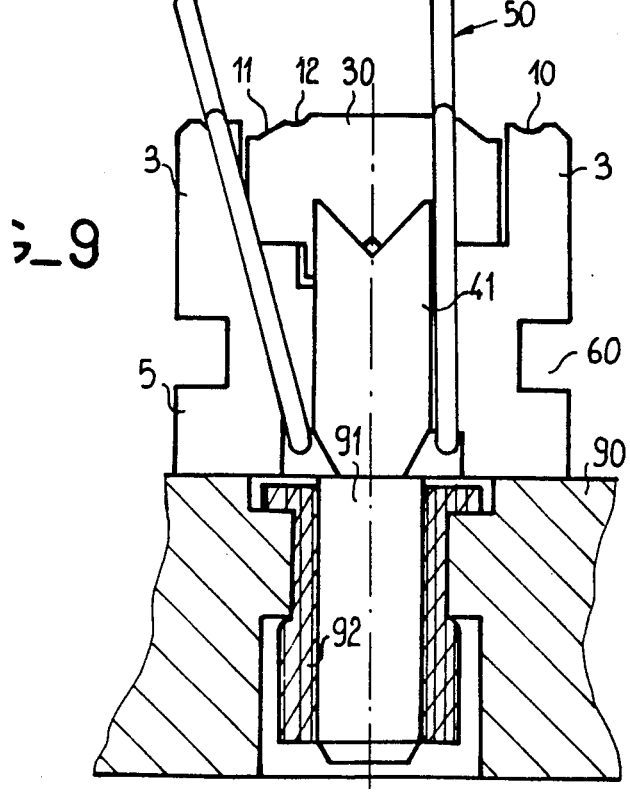

FIG_10-a
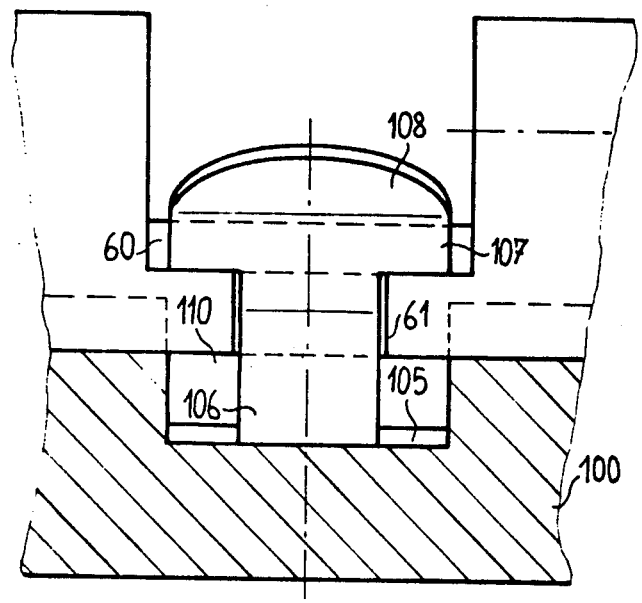
FIG_10-b
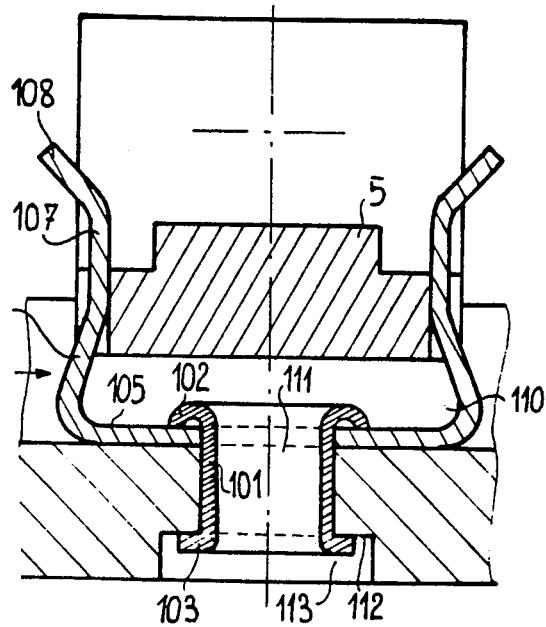

DEVICE FOR SEMI-PERMANENT CONNECTION OF OPTICAL FIBRES AND METHOD FOR ESTABLISHING THE SAME

BACKGROUND OF THE INVENTION

The present invention concerns a device for the semi-permanent connection of optical fibres, intended to join end-to-end two n optical fibres, with n being an integer higher than or equal to 1, as well as a process for establishing such connection.

French patent application filed under No. 82 05441 in the name of the applicant dicloses a device for the semi-permanent connection of optical fibres in which the optical fibres are maintained in position by a sleeve which ensures realignment and exerts upon said clamp a transversal elastic force of predetermined intensity.

SUMMARY OF THE INVENTION

The present invention provides an improvement of such a device, allowing facilitating of the centering and fixation of the optical fibres within the connection device.

The invention also provides a semi-permanent connection device intended to join end-to-end two n fibres with n being an integer higher than or equal to 1, which comprises:

a support, (or connector body) having, e.g., V-shaped channel means comprised, for example, of three parts adapted to receive the ends of the optical fibres and comprising three parts, namely a central part adapted to receive a realignement clamp for elastically maintaining the stripped fibres placed end-to-end, and two end parts each adapted to receive a retaining clamp for longitudinally retaining the fibres within the grooves in an area where they are not stripped bare;

means for clamping the realignment clamp and the retaining clamps, these means presenting, as regards the realignment clamp and at least one holding clamp, two clamping positions, the first position, or sliding position, allowing the sliding of at least one optical fibre along the V-shaped channel and the second position, or blocking position, ensuring its blocking in position for the retaining clamp, and for the realignment clamp the first one allowing the sliding of at least one optical fibre along the V-shaped channel, the second ensuring the exact centering of the optical faces of the fibres.

The clamping means of the retaining and realignment clamps can advantageously also present a rest position in which they are maintained in position on the support.

According to a first variant, at least one clamp is movable around a rigid shaft or a flexible shaft on the connector body and comprises clamping means situated opposite facing such articulation, or on each of the two sides opposite facing the clamp.

According to a second variant, at least one clamp is movable around a rigid shaft or a flexible shaft and comprises clamping means engaging the clamp at its center.

According to a third variant, at least one clamp is detachable and comprises clamping means engaging said clamp on each of its opposite sides.

One kind of clamping means can be a clip, one end of which is placed in the support and the opposite end of which is adapted to be placed selectively in two grooves provided on one side of a clamp, and corresponding respectively to each of the two positions. The three parts of the support can be separated by grooves intended to allow free passage of the lateral legs of the clips.

At least one clamp can be disposed within a recess of the support.

At least one clamp may be elastic and comprise in its central part and along a given length l, an elastically deformable membrane longitudinally disposed with respect to the optical fibre.

The invention also concerns a method of establishing semi-permanent connection of 2n optical fibres with n being an integer higher than or equal to 1, by means of a device such as mentioned herein-above, which method comprises the steps of:

(a) stripping bare the ends of the optical fibres by removing their mechanical protection sheath along a given length;

(b) maintaining blocked in position at least a first optical fibre on one side of the connector body, by means of a retaining clamp while placing clamping means in the blocking position, the end of the optical fibre being positioned at the center of the support;

(c) placing the realignment clamp and the second retaining clamp on their first sliding position, clamping position, in such a way as to allow the sliding of at least one second optical fibre under the second retaining clamp and under the retaining clamp until it abuts on the first optical fibre;

(d) placing the maintenance clamp and the second retaining clamp in their second clamping position, (i.e., blocking position).

BRIEF DESCRIPTION OF THE DRAWINGS

The invention will become more apparent by reading through the following description given by way of non-limitative example, with reference to the appended drawings in which:

FIGS. 1a and 1b are respectively perspective and sectional views, with torn-away portions, showing a first variant of the device according to the invention;

FIGS. 2a and 2b are end views of a second and a third variant of the device according to the invention;

FIGS. 3a and 3b are respectively a sectional plan view and a partial longitudinal sectional view of a fourth variant of the device according to the invention;

FIGS. 4a and 4b are respectively a plan view and a longitudinal sectional view of a connector body according to FIGS. 1a and 1b, and FIGS. 4c–4e are respectively sectional views taken along lines EE, DD and FF of FIG. 4b;

FIGS. 5a, 5b and 5c are respectively views in longitudinal sectional and cross-sectional plan, showing an elastic clamp according to one embodiment of the invention;

FIGS. 6a and 6b are respectively a cross-sectional view and a side view, showing a retaining clamp according to the invention;

FIG. 7 is a lateral view of a clip constituting holding or retaining means according to the invention;

FIGS. 8a to 8b are cross-sectional views illustrating the different possible positions of the clip of FIG. 7 for obtaining the clamping of an elastic clamp and a retaining clamp respectively;

FIG. 9 represents an embodiment of the assembly of the device according to the invention on a connection plate; and FIGS. 10a and 10b are respectively logitudinal and cross-sectional views showing another embodiment of the assembly of the device according to the invention on a connection plate.

DETAILED DESCRIPTION OF THE PREFERRED EMBODIMENT

According to FIGS. 1a and 1b, a support 5 presents a V-shaped channel 4 extending over the entire length of its upper face. This channel 4 crosses through three parts of the support, to wit, an end part 2, a central part 1 and a second end part 3. The two optical fibres are joined at a central part 1 due to the elastic force exerted by the holding clamp constituted, in the present example by a flexible clamp 20. End parts 2 and 3 are intended to secure in position the two optical fibres in a zone where they are not stripped bare, by means of retaining clamps 30. Flexible clamp 20 and retaining clamp 30 are disposed within recesses 7', 8' and 9', respectively, in which they are secured by clips 50 the lower portion 51 of which is retained in one of two longitudinal grooves or channels 62 provided in the lower portion of connector body 5 (cf. FIGS. 4c to 4e). Each clip 50 is actuated at its upper portion by a loop 58 which allows to displace two shoulders 55 towards either one of the two grooves 11 and 12 each corresponding to a clamping position of the clamp. Groove 11 corresponds to a position wherein the corresponding optical fibre can slide below the clamp, while groove 12 corresponds to the fibre locking in position. Furthermore, a groove 10 is provided on the lateral rims 7, 8 and 9 of recesses 7', 8' and 9' in such a way as to receive clip 50 in rest position where it no longer exerts any clamping pressure upon the clamps, but wherein said clamps can be positioned within the corresponding recesses.

Refering more specifically to FIGS. 4a and 4b, it will be observed that V-shaped channel 4, in fact, comprises several portions having different depths so as to avoid havin9 a radius of curvature on the fibre, to allow blocking of the fibres that are not stripped bare in the zone of the retaining clamps and securing in position the fibres the mechanical protection sheath of which has been removed, in the zone of elastic clamp 20. FIGS. 1a and 1b also represent apertures 40 disposed between part 1 and parts 2 and 3 and which allow the lateral faces of clips 50 to pass when said clips are actuated to be moved into their different positions.

According to FIGS. 5a to 5c, the elastic clamp 20 comprises an elastic membrane 23 extending longitudinally between two transversal walls 22. Transversal walls 22 are connected to each other on each side by longitudinal walls 21, the lower part 25 of which acts as an abutment during clamping of the clamp in the central part 1. As can be seen from FIG. 5c, flexible blade or membrane 23 protrudes slightly from the lower part 25 of the longitudinal walls 21, which limits the rising motion or stroke of blade 23 and consequently the force exerted upon the fibres. This allows maintaining the fibres in their end-to-end position without exerting on them too great a vertical stress which would be liable to produce undesirable attenuations of the signal. On either side of the blade 23 a space 24 extends over part of the length of blade 23, this space 24 opening into a recess 25 surrounded by walls 21 and 22.

According to FIGS. 6a and 6b, retaining clamp 30 has a flat bottom 31 and bevelles edges 33 on its lateral faces. It will be seen that such a clamp can, in a variant, be constructed in the form of an elastic clamp similar to clamp 20.

According to FIGS. 2a and 2b, 3a and 3b, the clamps can be hingedly connected to connector body 5.

According to FIG. 2a, a retaining clamp 30, which can be flat clamp or, as shown, an elastic clamp having an elastic membrane 23', is connected to a rim 204 of connector body 5 by a flexible articulation 200 comprising a zone 203 for connection to body 5, a bending zone 202 and a zone for connection with clamp 30 proper. A passage 201 is provided in the edge 9 so as to allow angular displacement of flexible hinging 200, which preferably extends along the whole length of clamp 30. On the opposite side of hinge connection 200, clamp 30 is retained by a clip 50, which, as shown in FIGS. 1a and 1b can be disposed in two positions for blocking clamp 30, i.e. either in concavity 11 or in groove 12. A clip 50 may be used on the side of hinging 200. In this case, and if it is desired to provide a rest groove 10 for the clip 50 in the support, the width of passage 201 is smaller than the length of clamp 30.

According to FIG. 2b, the lateral edge 21 of clamp 30 is connected to a sloped flat portion 205 of a rim 204' of connector body 5 through the intermediary of a flexible hinge connection 200' comprising a sloped flat portion 205. At the end opposite said hinge connection 200', the clamping of clamp 30 in its first position is ensured by a tongue 214 which engages in an upper edge 216 of an opening 215 provided in edge 9. A recess 210 is provided in the lateral edge 211 of clamp 30 opposite lateral edge 21. A projection 212 extends from the outside of clamp 30 starting from the lower portion of lateral edge 211. Projection 212 is followed by an upwardly directed bend 213 of 90°, the end of which bears tongue 214 which extends in a direction inclined towards the outside of the clamp 30 with respect to the vertical. The length of tongue 214 and its elasticity is such that once it is engaged in an upper edge 216, projection 212 is not applied onto connector body 5 and transmits to membrane 23' a clamping force such that the sliding of the fibre in channel 4 remains possible. Clamp 30 does not comprise a groove such as 11, but comprises a groove 12. When a clip 50 is positioned therein, clamp 30 is in abutment on connector body 5 and membrane 23' is displaced upwards with its maximal stroke, which corresponds to the blocking of the fibre in channel 4.

According to FIGS. 3a and 3b, a realignment clamp 20 (and/or retaining clamp) has on the lateral edge 21 a projection 300 bearing a shaft 301 which protrudes from it at each of its ends. These are placed in "key-hole"-shaped grooves 302, which secure them while allowing their rotation. On the opposite side, the clamp is secured by a clip 50 cooperating either with two grooves 11 and 12 as shown or with a single groove 12, the first clamping position thus being ensured by a tongue such as tongue 214.

According to FIG. 7, a clip 50 comprises on its upper portion a loop 58 and two retaining arms or legs 55 which are extended downwardly beyond a shoulder 54 to form lateral parts 53 which are terminated at the lower end by a bend 52 which bears retaining legs 51 that are bent slightly upwardly so as to produce a spring effect.

With reference to FIGS. 8a, 8b and 1a and 1b, an example illustrating the method of mounting the fibres in the connection device according to the invention will now be described. First of all, using cleaving pliers the ends of the optical fibres are stripped bare of their mechanical protection sheath on the given length corresponding at least to slightly more than half of the length of the flexible clamp. The support is opened in order to facilitate the opositioning of the fibres. Thereafter, one of the fibres is placed into channel 4 so that its split end is situated approximately in the middle of recess 7'. Then, a retaining clamp 30 is placed on the same side by placing clip 50 in groove 12 (blocking position) so as to secure the first fibre $F_1$ in position. Thereafter the other end of fibre $F_2$ is positioned in the V-shaped channel of support 5 adjacent to the split face of the first fiber F. The realignment clamp, and then the second retaining clamp are thereafter placed in recesses 7' and 9' and the clips 50 of the two clamps are placed in the corresponding grooves 11. The second fibre $F_2$ is thereafter made to slide in channel 4 along the retaining clamp and the realignment clamp until it abuts against the first fibre $F_1$ which is blocked in position by the first retaining clamp. The clips of the second retaining clamp are thereafter placed in position, then the realignment clamp in the corresponding grooves 12 so as to secure in position fibre $F_2$ which has previously been placed end to end with fibre $F_1$.

According to FIG. 9, support 5 bears on its lower portion a plurality of studs 91 adapted to be forcibly introduced into holders 92 provided on a plate 90. Plate 90 is adapted to bear several rows of holders 92 allowing a plurality of connection devices according to the invention to be fixed thereon.

According to the variant represented in FIGS. 10a and 10b, a plate 100 bears fixing clamps 104 maintained fixed by rivets 101 on a plate 100. Rivets 101 are bent at 103 over the edges 112 of an opening 113, each rivet 101 being placed in an opening 111 and bent over at 102 about a flat portion 105 of the clamps 104. Starting from the horizontal portion 105, clamp 104 comprises a bent zone 106 which engages slots 61 adjacent to the grooves 60 provided in connector body 5. The fixing is obtained through using clamps which are wider than slot 61 and which are placed in slot 60. Clamp 107 is extended by an outwardly bent portion 108 which allows to remove clamp 107 from groove 60 during dismounting of connector body 5.

By way of non-limitative example, the values of the retaining forces applied will be given, both for the flat clamps and the elastic clamps, and for fibres having an outer diameter comprised between 100 and 1000 μm.

For a non-stripped fibre having a nominal diameter of 125 μm, disposed within a channel 4 of a depth of 0.13 mm, and protruding from this channel by a distance d equal to 0.02 mm, the sliding of the fibre could be ensured by using a flat clamp having a length of 30 to 100 times the diameter of the fibre, the vertical bearing forces being about 0.5 and 1.5 N. If an elastic clamp is used, the blocking of the fibre will be obtained by putting the lower face of the clamp in abutment, which corresponds to a bearing force of the fibre of about 4 times that mentioned herein-above.

The present invention is not limited to the embodiments described and represented herein-above. Accordingly, any connector body can comprise a plurality of channels 4 each adapted to receive a pair of optical fibres such as $F_1$ and $F_2$. In this case, the process is carried out as described herein-above with the exception that the operations are realized simultaneously on all of the fibres located on each side. Furthermore, as can be seen from the description, the retaining clamps can be in the form of flat or flexible clamps.

What is claimed is:
1. A device for the semi-permanent connection of two n optical fibres by joining them end to end, n being an integer, higher than or equal to 1, comprising:
   a support having a V-shaped channel adapted to receive the ends of said optical fibres and the support comprising a central part adapted for receiving a realignment clamp and contructed for elastically maintaining the ends of the stripped fibres placed end to end when a realignment clamp is received thereon, and two end parts, each adapted for receiving a retaining clamp, and constructed for maintaining in position the fibres in a zone where they are not stripped bare;
   a realignment clamp for being received on said central part of said support and for elastically maintaining each of said stripped fibers in end to end aligned abutting relationship;
   two retaining clamps for being received, respectively, on the end parts of said support and for maintaining in position fibers in a zone where they are not stripped bare;
   clamping means for securing said realignment and retaining clamps, said clamping means being movable, with respect to the realignment clamp and at least one of said retaining clamps, between a first clamping position wherein at least one optical fibre can slide along the V-shaped channel, and a second clamping position ensuring the blocking in position of said fibre; and
   at least one clip hingedly connected to the body of said device, and at least one retaining arm on said clip located opposite the hinged connection.

2. A device according to claim 1, in which the clamping means further comprises a means for locking the clamp in the support, which corresponds to the first clamping position, and said means for locking being a clip, one end of which is placed in the support and the opposite end of which is adapted to engage a groove provided on the side of the clamp located opposite said hinged connection, which corresponds to said second position.

3. A device for the semi-permanent connection of two n optical fibres by joining them end to end, n being an integer, higher than or equal to 1, comprising:
   a support having a V-shaped channel adapted to receive the ends of said optical fibres and the support comprising a central part adapted for receiving a realignment clamp and constructed for elastically maintaining the ends of the stripped fibres placed end to end when a alignment clamp is received thereon, and two end parts, each adapted for receiving a retaining clamp, and constructed for maintaining in position the fibers in a zone where they are not stripped here;
   a realignment clamp for being received on said central part of said support and for elastically maintaining each of said stripped fibers in end to end aligned abutting relationship;
   two retaining clamps for being received, respectively, on the end parts of said support and for maintaining in position fibers in a zone where they are not stripped bare;
   clamping means for securing said realignment and retaining clamps, said clamping means being movable, with respect to the realignment clamp and at least one of said retaining clamps, between a first clamping position wherein at least one optical fibre can slide along the V-shaped channel, and a second clamping position ensuring the blocking in position of said fibre; and at least one clip hinged about a flexible shaft, and at least one retaining arm on said clip.

4. A device for the semi-permanent connection of two n optical fibres by joining them end to end, n being an integer, higher than or equal to 1, comprising:

- a support having a V-shaped channel adapted to receive the ends of said optical fibres and the support comprising a central part adapted for receiving a realignment clamp and constructed for elastically maintaining the ends of the stripped fibres placed end to end when a realignment clamp is received thereon, and two end parts, each adapted for receiving a retaining clamp, and constructed for maintaining in position the fibers in a zone where they are not stripped bare;
- a realignment clamp for being received on said central part of said support and for elastically maintaining each of said stripped fibers in end to end aligned abutting relationship;
- two retaining clamps for being received, respectively, on the end parts of said support and for maintaining in position fibers in a zone where they are not stripped bare;
- clamping means for securing said realingment and retaining clamps, said clamping means being movable, with respect to the realignment clamp and at least one of said retaining clamps, between a first clamping position wherein at least one optical fibre can slide along the V-shaped channel, and a second clamping position ensuring the blocking in position of said fibre; and
- at least one clip hinged about a shaft, and at least one retaining arm on said clip engaging the center of the clamping means and situated opposite this hinged connection.

* * * * *